(12) United States Patent
Cohen (10) Patent No.: US 9,279,541 B2
(45) Date of Patent: Mar. 8, 2016

(54) METHOD AND SYSTEM FOR TEMPERATURE-CONTROLLED GAS DISPENSING

(71) Applicant: Air Products and Chemicals, Inc., Allentown, PA (US)

(72) Inventor: Joseph Perry Cohen, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 386 days.

(21) Appl. No.: 13/867,208

(22) Filed: Apr. 22, 2013

(65) Prior Publication Data

US 2014/0311622 A1    Oct. 23, 2014

(51) Int. Cl.
| | | |
|---|---|---|
| *F17C 5/06* | (2006.01) | |
| *F17C 13/02* | (2006.01) | |
| *F17C 7/00* | (2006.01) | |

(52) U.S. Cl.
CPC ... *F17C 5/06* (2013.01); *F17C 7/00* (2013.01); *F17C 13/025* (2013.01); *F17C 13/026* (2013.01); *F17C 2205/0326* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/03* (2013.01); *F17C 2227/0388* (2013.01); *F17C 2250/032* (2013.01); *F17C 2250/043* (2013.01); *F17C 2250/0439* (2013.01); *F17C 2250/0491* (2013.01); *F17C 2250/0626* (2013.01); *F17C 2250/0631* (2013.01); *F17C 2250/0689* (2013.01); *F17C 2250/0694* (2013.01); *F17C 2260/023* (2013.01); *F17C 2260/025* (2013.01); *F17C 2265/065* (2013.01); *F17C 2270/0139* (2013.01)

(58) Field of Classification Search
CPC ......... F17C 5/06; F17C 13/025; F17C 13/026
USPC ........................................ 141/1, 94, 95, 192
See application file for complete search history.

(56) References Cited

U.S. PATENT DOCUMENTS

| | | | |
|---|---|---|---|
| 5,868,176 A | | 2/1999 | Barajas |
| 5,901,758 A | * | 5/1999 | Hwang et al. ..................... 141/2 |
| 6,619,336 B2 | | 9/2003 | Cohen et al. |
| 6,708,573 B1 | * | 3/2004 | Cohen et al. .................... 73/865 |
| 7,178,565 B2 | | 2/2007 | Eichelberger et al. |
| 7,328,726 B2 | * | 2/2008 | Cohen et al. ..................... 141/9 |
| 7,568,507 B2 | * | 8/2009 | Farese et al. .................... 141/95 |
| 7,575,012 B2 | * | 8/2009 | Miki et al. ........................ 137/1 |
| 7,905,252 B2 | * | 3/2011 | Neumann et al. ............. 137/606 |
| 8,020,589 B2 | * | 9/2011 | Cohen et al. .................... 141/95 |
| 8,365,777 B2 | | 2/2013 | Farese et al. |
| 8,684,044 B2 | | 4/2014 | Saiki et al. |

(Continued)

FOREIGN PATENT DOCUMENTS

| | | |
|---|---|---|
| DE | 10 2010 027683 A1 | 1/2012 |
| EP | 1 336 795 A2 | 8/2003 |
| EP | 1 693 612 A2 | 8/2006 |
| EP | 1 818 597 A2 | 8/2007 |
| EP | 1 865 248 A1 | 12/2007 |

(Continued)

*Primary Examiner* — Timothy L Maust
(74) *Attorney, Agent, or Firm* — Bryan C. Hoke, Jr.

(57) ABSTRACT

A system and method for dispensing a compressed gas into a receiving vessel wherein a target temperature profile for the receiving vessel during dispensing is provided, and the flow rate of compressed gas into the receiving vessel is controlled to conform the temperature profile for the receiving vessel during dispensing to the target temperature profile.

23 Claims, 3 Drawing Sheets

(56) References Cited

U.S. PATENT DOCUMENTS

| | | |
|---|---|---|
| 2006/0180237 A1 | 8/2006 | Hoke, Jr. et al. |
| 2007/0079892 A1 | 4/2007 | Cohen et al. |
| 2010/0307636 A1 | 12/2010 | Uemura |
| 2012/0031525 A1* | 2/2012 | Wonders .......................... 141/4 |
| 2012/0216910 A1 | 8/2012 | Inagi |
| 2013/0014854 A1 | 1/2013 | Mori |

FOREIGN PATENT DOCUMENTS

| | | |
|---|---|---|
| EP | 2 093 475 A1 | 8/2009 |
| JP | 08100895 | 4/1996 |
| JP | 09183988 | 7/1997 |
| JP | 2008538321 A | 10/2008 |
| JP | 2010236673 A | 10/2010 |
| WO | 96/22915 A1 | 8/1996 |

* cited by examiner

METHOD AND SYSTEM FOR TEMPERATURE-CONTROLLED GAS DISPENSING

BACKGROUND

The present invention relates to a method and system for dispensing a compressed gas into a receiving vessel, and more specifically to a method and system for dispensing a compressed gas as in particular hydrogen into a receiving vessel, such as a vehicle fuel tank, rapidly but nevertheless safely.

When dispensing a compressed gas into a receiving vessel, care has to be taken that the receiving vessel does not overheat. Overheating may occur as a result of adiabatic compression of the gas. If the gas is hydrogen or helium, the reverse Joule-Thompson effect will also contribute in heating the vessel. Gas filling protocols, in particular hydrogen fueling protocols, that are most commonly in use are based on worst case assumptions when selecting appropriate filling rates. Since receiving vessels seldom have worst case properties, and vessel conditions are seldom worst case conditions, and therefore the commonly used protocols are often excessively conservative and result in prolonged time for dispensing the compressed gas.

U.S. Pat. No. 6,619,336 (Cohen et al.) improves the dispensing operation in that the pressure and temperature are determined and the density of the gas in the receiving vessel is calculated therefrom. This actual density is compared with a vessel-rated density to control the flow of the compressed gas in response to the comparison. If the actual density in the receiving vessel is greater than or equal to the rated density, minus a tolerance, gas flow is halted, and either resumed, if the actual density should have fallen below the rated density within a predetermined time interval, or terminated.

U.S. Pat. No. 7,178,565 (Eichelberger et al.) incorporates the ambient temperature to mitigate overheating the receiving vessel. Depending on the ambient temperature one of several predetermined rates of pressure rise, i.e. a pressure ramp rate, in the receiving vessel is selected. Furthermore, a temperature indicative for the temperature of the gas in the receiving vessel is measured during filling. The ramp rate is maintained at the selected value until the measured temperature reaches a preset upper limit. Upon reaching this temperature limit, an electronic controller commands a pressure control valve to temporarily pause at the instantaneous pressure level. The pause remains in effect until the instantaneous temperature at the receiving vessel has dropped to a predetermined value below the set temperature, at which time the pressure ramp rate is increased to its former high dispensing rate.

Start/stop methods, however, confuse the customer each time the dispensing process stops and restarts.

US 2007/0079892 A1 (Cohen et al.) discloses controlling the flow rate of the compressed gas by means of a pipe organ style flow control device composed of a plurality of fluid conveyance lines in parallel with each other and having differing orifice coefficients for transmitting gas at different flow rates therethrough. Each of the fluid conveyance lines can be opened and closed by means of a respective control valve commanded by a programmable flow controller including a desired ramp rate. A pressure monitor downstream of the fluid conveyance lines measures the pressure of gas being directed into the receiving vessel. The flow controller compares the desired pressure ramp rate with the measured pressure and controls the flow rate of gas through the fluid conveyance lines in response to the comparison. Monitoring temperature is not disclosed.

It is an object of the present invention to provide a method and system for dispensing a gas into a receiving vessel in a safe and time efficient manner.

It is desirable to dispense gas into the receiving vessel as quickly as possible, without violating the vessel temperature limit, which typically is 85° C. for vehicle fuel tanks.

A further object is to smooth out the dispensing process, i.e. to dispense gas into the receiving vessel at a dispensing rate which is steadier than with the conventional methods and systems, so that the customer experiences consistent flow rates and sounds during the dispensing process.

There is also a need for a method and system for dispensing a compressed gas, in particular hydrogen, into the fuel tank of a combustion engine or fuel cell vehicle in a time efficient manner without overheating the fuel tank.

BRIEF SUMMARY

The present invention accomplishes rapid dispensing of compressed gas into a receiving vessel by prescribing a target temperature profile for the receiving vessel and regulating the flow rate of the compressed gas such that the temperature profile that the receiving vessel undergoes during dispensing conforms to the prescribed target temperature profile. Overheating the receiving vessel is safely prevented, since by conforming or matching the temperature profiles, the maximum temperature limit is avoided. In contrast to known dispensing methods and systems the invention focuses on a critical process variable, namely temperature, and prescribes a temperature profile in terms of this variable and regulates dispensing of the compressed gas to conform or match, i.e. to approach or achieve the desired target temperature profile.

A basic subject (Subject 1) is a method for dispensing a compressed gas into a receiving vessel which employs a system comprising a supply of compressed gas, a fluid conveyance operatively connecting the supply of compressed gas to the receiving vessel, a flow control device capable of varying the flow rate of compressed gas through the fluid conveyance, and a flow controller for controlling the flow control device. The method includes at least the steps of:
   (a) passing compressed gas from the supply through the fluid conveyance into the receiving vessel,
   (b) providing a target temperature from a target temperature profile for the receiving vessel, the target temperature profile for the receiving vessel providing target temperatures during dispensing,
   (c) varying the flow rate of compressed gas during dispensing by means of the flow control device to conform the temperature profile of the receiving vessel to the target temperature profile, and
   (d) repeating steps (b) and (c) during the dispensing process, i.e. while dispensing the compressed gas into the receiving vessel.

A basic further subject (Subject 2) is a system for dispensing compressed gas into a receiving vessel, the system comprising:
   (a) a supply of compressed gas,
   (b) a receiving vessel,
   (c) a fluid conveyance for operatively connecting the supply to the receiving vessel,
   (d) a flow control device capable of varying the flow rate of compressed gas through the fluid conveyance, and
   (e) a flow controller for controlling the flow control device,
   (f) wherein the flow controller is configured to store a target temperature profile for the receiving vessel, the target temperature profile for the receiving vessel providing target temperatures during dispensing, and (g) wherein the flow controller is configured to command the flow control device to vary the flow rate of compressed gas such that the temperature profile of the receiving vessel conforms to the target temperature profile.

In basic embodiments, the invention uses feed-forward control, the target temperature of the target temperature profile being provided as the reference variable. In the basic embodiments, the flow controller commands or is configured/adapted to command the flow control device on the basis of a hard-wired or programmed control routine that tries to conform and/or match the target temperature profile thereby reducing the deviation between the temperature profile of the receiving vessel and the target temperature profile for the receiving vessel.

In further developed embodiments, the invention provides a feedback control wherein the target temperature of the target temperature profile is a reference variable and an apparent temperature representative for an instantaneous temperature of the receiving vessel is a controlled process variable, and the flow controller determines a deviation between the reference variable and the controlled variable and creates an actuating or correcting variable for the flow control device in order to decrease the deviation.

A more specific subject is accordingly a method of dispensing compressed gas into a receiving vessel which employs a system comprising a supply of compressed gas, a fluid conveyance for operatively connecting the supply of compressed gas to the receiving vessel, a flow control device capable of varying the flow rate of compressed gas through the fluid conveyance, and a flow controller for controlling the flow control device. The method includes at least the steps of:
(a) passing compressed gas from the supply through the fluid conveyance into the receiving vessel,
(b) providing a target temperature from a target temperature profile for the receiving vessel, the target temperature profile for the receiving vessel providing target temperatures during dispensing,
(c) determining an apparent temperature which is representative for an instantaneous temperature of the receiving vessel,
(d) determining a deviation between the apparent temperature and the target temperature from the target temperature profile,
(e) varying the flow rate of compressed gas during dispensing by means of the flow control device in response to the deviation to conform an apparent temperature profile of the receiving vessel to the target temperature profile and
(f) repeating steps (b) to (e) during dispensing, i.e. while passing the compressed gas into the receiving vessel, wherein the apparent temperature profile is produced from the apparent temperatures.

Also a subject of the further developed type is a system for dispensing a compressed gas into a receiving vessel, the system comprising:
(a) a supply of compressed gas,
(b) a receiving vessel,
(c) a fluid conveyance for operatively connecting the supply to the receiving vessel,
(d) a flow control device capable of varying the flow rate of compressed gas through the fluid conveyance,
(e) a temperature sensor for determining apparent temperatures for the receiving vessel and generating temperature signals based on the apparent temperatures, and
(f) a flow controller for controlling the flow control device responsive to the temperature signals from the temperature sensor,
(g) wherein the flow controller is configured to store a target temperature profile for the receiving vessel, the target temperature profile for the receiving vessel providing target temperatures during dispensing,
(h) wherein the flow controller is configured to calculate, successively during dispensing, deviations between the apparent temperatures and associated target temperatures from the target temperature profile,
(i) and wherein the flow controller is configured to command the flow control device to vary the flow rate of compressed gas in response to the deviations to conform an apparent temperature profile of the receiving vessel based on the apparent temperatures to the target temperature profile.

The target temperature profile for the receiving vessel comprises a series of target temperatures. The target temperature profile can be provided as a path of target temperatures, in particular, versus pressure and/or elapsed dispensing time. The target temperature profile can increase from a starting target temperature to a final target temperature. It can be linear or based on a model of vessel heating. The target temperature (as the ordinate variable) increases preferably along a path concave with respect to the abscissa variable, e.g. as a function of pressure and/or elapsed dispensing time.

The starting target temperature can be derived from or may coincide with an apparent temperature representative for the instantaneous temperature of the receiving vessel at the time the receiving vessel is connected with the supply or before or together with starting the dispensing process. Determination of the starting target temperature can in particular be based on a measurement of a temperature. The final target temperature can be a preset upper temperature limit of the respective receiving vessel. The final target temperature may in particular be a rated maximum vessel temperature minus a safety margin. If the rated maximum temperature is, for example, 85° C., which is a typical rated maximum temperature of a land vehicle fuel gas tank, the final target temperature would be lower than 85° C. and might be selected within a range, for example, between 80 and 84° C. The system may have the capability to identify the respective receiving vessel and select the final target temperature appropriately adapted to the respective receiving vessel. In typical applications however, the receiving vessels to be filled have the same or almost the same rated maximum vessel temperature, and the final target temperature can be identical for all of these vessels.

The target temperature profile may be predetermined discrete target temperature values versus elapsed dispensing time and/or pressure, or may be provided by means of an equation for the target temperature. It can in particular be generated based on a process variable of the dispensing process and determined real-time during dispensing. A combination of both is also conceivable, i.e. the target temperature may be predetermined over one or more first sections of the path and generated as a function of a process variable over one or more second sections of the path.

Pressure is an expedient choice of a process variable to base the vessel temperature profile on. In pressure-based embodiments the target temperature may be provided as a function of a pressure, preferably an apparent pressure, which is representative for the instantaneous pressure of the gas in the receiving vessel and may be derived by pressure measurement. A method in which the profile is generated over at least a part of the dispensing process, preferably over the complete dispensing process, may accordingly include the steps of:

(a) passing compressed gas from the supply through the fluid conveyance into the receiving vessel,
(b) determining an apparent pressure representative for an instantaneous pressure of the gas in the receiving vessel,
(c) generating a target temperature as a function of the apparent pressure,
(d) determining an apparent temperature representative for an instantaneous temperature of the receiving vessel,
(e) determining a deviation between the apparent temperature and the target temperature,
(f) varying the flow of compressed gas by means of the control device in response to the deviation to conform the apparent temperature profile of the receiving vessel to the target temperature profile,
(g) and repeating steps (b) to (f) during the dispensing process.

The target temperature profile can alternatively be provided as a function of time elapsed since dispensing has commenced or, in a mixed mode, as a function of both pressure and elapsed dispensing time. In the mixed mode the dispensing process can comprise one or more first time intervals and one or more second time intervals and the target temperature provided as a function only of time over the one or more first time intervals and as a function only of pressure over the one or more second time intervals. In a variant of the mixed mode the target temperature profile is provided as a function of time over the complete dispensing process or only part of the dispensing process but verified by one or more pressure checks during dispensing. The time dependent function may be altered subject to those pressure checks. In a further variant of the mixed mode a function describing the target temperature profile contains a pressure dependent term and a time dependent term, for example as additive terms.

The steps to be repeated in the basic and the further developed embodiments, and also in the pressure-based embodiments, are repeated at least once, i.e. are performed at least twice during the dispensing process. Preferably the respective steps are repeated more than once during the dispensing process in order to shorten the time required for dispensing the compressed gas. The more frequently the respective cycle is passed through, the more the dispensing process can be shortened. If one divides the time required to fill the receiving vessel, $t_{total}$, to a desired final pressure in a number n of equal time intervals, the frequency $f = cycles/t_{total}$ at which the cycles are passed through is preferably at least 5 with $n \geq 5$, and more preferred at least 10 with $n \geq 10$, at least one cycle being performed in each of the n time intervals. Typically, the respective cycle of steps is repeated at least once per second.

The determination of the apparent temperature can in particular be based on a temperature measurement. The temperature measured can be the temperature of the compressed gas inside the receiving vessel, which requires temperature measurement inside the receiving vessel. In such embodiments a temperature sensor is in direct contact with the compressed gas. As a substitute, the temperature of a structural part of the receiving vessel, e.g. the shell of the vessel, may be measured. A temperature sensor for that purpose can be attached to or build into the respective structural vessel part, or the heat radiated by the receiving vessel can be measured. Instead of measuring a temperature in or of the receiving vessel, the temperature can be measured in or at the fluid conveyance, for example, in or at a hose of the fluid conveyance or a connection assembly by which the fluid conveyance is connected to the receiving vessel to fill the vessel and which can be disconnected from the receiving vessel once the dispensing operation is completed. The temperature can in principle be measured anywhere as long as the temperature measured is representative for the instantaneous temperature of the gas in the receiving vessel, i.e. allows to back-reference to the instantaneous temperature of the receiving vessel or the gas in the receiving vessel. However, the closer to the vessel shell or interior of the vessel the temperature is measured, the smaller the safety margin can be chosen, and the quicker the vessel can be filled.

The supply may be used to fill a plurality of interconnected receiving vessels. The supply may be connected via the fluid conveyance with a first one of the receiving vessels, the one or more further receiving vessels being filled via this first receiving vessel. More expediently, the two or more receiving vessels may be filled in parallel via a manifold. If, for example, each of the interconnected receiving vessels is equipped with a temperature sensor for sensing an apparent temperature of the respective vessel, the dispensing process is preferably based on the highest of the apparent temperatures. In such cases, the receiving vessel system, e.g. a vehicle comprising the plurality of interconnected vessels, may decide which of the different apparent temperatures is the highest and will accordingly have to be used to determine the deviation between the apparent temperature and target temperature. Alternatively, the flow controller can be adapted to receive an apparent temperature of each or selected ones of the interconnected receiving vessels, determine which of these apparent temperatures is the highest and select this temperature value for the determination of the deviation.

The deviation between the apparent temperature and the target temperature can be determined directly as the difference between the target temperature and the apparent temperature or as any other measure representative for the mathematical difference, for example as the ratio of apparent temperature to target temperature or vice versa. Since the deviation may be defined as the difference between the target temperature and the apparent temperature, the deviation may have a value of zero. The flow of the compressed gas can be regulated directly in response to the difference between the two temperature values or in response to a percentage deviation or in response to only the prefix of the difference, only to mention examples. The flow controller is adapted to control the control device accordingly.

In preferred pressure-based embodiments the apparent pressure is based on a pressure measurement. The pressure which is measured can in particular be the pressure of the gas inside the receiving vessel. Similar to the apparent temperature, however, the apparent pressure may instead be measured in or at the fluid conveyance, for example in or at a hose of the fluid conveyance or a connection assembly by which the fluid conveyance is releasably connected to the receiving vessel during the dispensing process. The apparent pressure can be used to generate the receiving vessel temperature profile, as explained earlier. In alternative pressure-based embodiments in which the target temperatures are provided versus pressure, the apparent pressure can be used to assign the respective apparent temperature to the associated target temperature of the vessel temperature profile for the determination of the temperature deviation.

The supply of compressed gas may be composed of a single source, e.g. a single compressor or more expediently a single pressurized supply vessel. The supply can however also comprise a plurality of sources of compressed gas, e.g. a plurality of compressors or a plurality of pressurized supply vessels, or a combination of at least one supply vessel and one or more compressors. The one or at least one of the plurality of supply vessels contains the gas at a pressure as high or higher than the pressure in the receiving vessel upon completion of the dispensing process, at least in embodiments which do not employ a compressor. Embodiments comprising a compressor do however not require a supply vessel, at least not a supply vessel at the site where the respective receiving vessel is filled. A compressor can for example be connected to a stationary supply line, e.g. a public or private gas distribution system, to compress the gas delivered therethrough to the pressure level required for dispensing.

A flow control valve, in particular a solenoid valve, is a suitable type of flow control device. In principal, a flow control device capable of varying the flow rate in increments will be sufficient. More suitable, however, is a control device capable of varying the flow rate of compressed gas continuously between a lower and an upper volume or mass flow rate. The flow control device can in particular be adapted to vary a flow cross-sectional area within the fluid conveyance. A fluid conveyance comprising only one conduit may comprise one or more flow control devices in that conduit, which is/are capable of varying the flow rate of compressed gas through that conduit alone or in a matched combined manner. If the fluid conveyance comprises two or more conduits in parallel to each other, one or more flow control devices can be provided in each of the conduits and commanded by the flow controller to match the target temperature profile. In principal, the flow control device can also be a variable speed and/or variable geometry compressor commanded by the flow controller such that the flow rate of compressed gas is regulated by means of the variable compressor to match the target temperature profile.

The flow controller is expediently an electronic flow controller commanding the flow control device via a wired or wireless communication. The flow controller can, in particular, be a programmable logic controller (PLC) or a computer-based controller. It can be composed of only a single unit or two or more units. If the target temperature profile is provided by some type of an input device, e.g. a computer, via a wired or wireless communication to, for example, a PLC, the combination of input device and PLC is regarded as the flow controller. A PLC or computer-based controller is preferably involved but may be replaced by a hard-wired controller.

Advantageous features are also described in the sub-claims and the combinations of the same.

In the following, specific aspects of the method and system will be outlined. The reference signs and expressions set in parentheses are referring to an example embodiment explained further below with reference to figures. The reference signs and expressions are, however, only illustrative and do not limit the aspect to any specific component or feature of the example embodiment. The aspects can be formulated as claims in which the reference signs and expressions set in parentheses are omitted or replaced by appropriate others.

Aspect #1: A method for dispensing a compressed gas into a receiving vessel employing a supply (102) of compressed gas, a fluid conveyance (103) operatively connecting the supply (102) to the receiving vessel (108), a flow control device (104) capable of varying the flow rate of compressed gas through the fluid conveyance (103), and a flow controller (114) for controlling the flow control device (104), the method comprising the steps of:
 (a) passing compressed gas from the supply (102) through the fluid conveyance (103) into the receiving vessel (108),
 (b) providing a target temperature ($T_{target}$) from a target temperature profile for the receiving vessel, the target temperature profile for the receiving vessel providing target temperatures during dispensing; and
 (c) varying the flow rate of compressed gas during dispensing by means of the flow control device (104) to conform the temperature profile that the receiving vessel (108) undergoes during dispensing to the target temperature profile, and
 (d) repeating steps (b) and (c) during the dispensing process.

Aspect #2: The method of Aspect 1, further comprising the steps of:
 (e) determining an apparent temperature ($T_{112}$) which is representative for an instantaneous temperature of the receiving vessel (108),
 (f) determining a deviation between the apparent temperature ($T_{112}$) and the target temperature ($T_{target}$) from the target temperature profile, and
 (g) repeating steps (b), (e), (f) and (c) during the dispensing process,
 (h) wherein the flow rate of compressed gas is varied in step (c) in response to the deviation to conform the apparent temperature profile of the receiving vessel (108) to the target temperature profile, and wherein the apparent temperature profile is produced from the apparent temperatures.

Aspect #3: The method of any one of the preceding Aspects, wherein the target temperature ($T_{target}$) is provided as a function ($T_{target}(p_{110})$) of a pressure ($p_{110}$) which is representative for the instantaneous pressure of the compressed gas in the receiving vessel (108).

Aspect #4: The method of any one of the preceding Aspects, wherein step (b) includes determining an apparent pressure ($p_{110}$) which is representative for the instantaneous pressure of the compressed gas in the receiving vessel (108) and providing the target temperature ($T_{target}$) by generating the target temperature as a function ($T_{target}(p_{110})$) of the apparent pressure ($p_{110}$).

Aspect #5: The method of any one of the preceding Aspects, further comprising the step of determining an initial apparent pressure ($P_0$) representative for an initial pressure of the compressed gas in the receiving vessel (108) before passing compressed gas into the receiving vessel (108), wherein the target temperature profile is determined depending on the initial apparent pressure ($P_0$).

Aspect #6: The method of any one of the preceding Aspects, further comprising the step of determining an initial apparent temperature ($T_0$) representative for an initial temperature of the receiving vessel (108) before passing compressed gas into the receiving vessel (108), wherein the target temperature profile is provided depending on the initial apparent temperature ($T_0$).

Aspect #7: The method of any one of the preceding Aspects, further comprising the step of providing a maximum temperature ($T_{max}$) representative for a maximum allowable temperature of the receiving vessel (108), wherein the target temperature profile is determined depending on the maximum temperature ($T_{max}$).

Aspect #8: The method of any one of the preceding Aspects, wherein the compressed gas is dispensed into the receiving vessel (108) at a rate of pressure rise, and the rate of pressure rise is varied to conform the temperature profile of the receiving vessel to the target temperature profile.

Aspect #9: The method of Aspect 2 alone or in combination with one or more of Aspects 3 to 8, wherein the compressed gas is dispensed into the receiving vessel (108) at a rate of pressure rise, and the rate of pressure rise is varied to decrease the deviation between the apparent temperatures ($T_{112}$) and the target temperatures ($T_{target}$).

Aspect #10: The method of any one of the preceding Aspects, wherein the receiving vessel temperature profile is predetermined, and linear or based on a model of receiving vessel heating.

Aspect #11: The method of any one of the preceding Aspects, wherein the target temperature profile is provided as a temperature path as a function of an apparent pressure which is representative for the instantaneous pressure of compressed gas in the receiving vessel and/or elapsed dispensing time.

Aspect #12: The method of any one of the preceding Aspects, wherein the target temperature profile is determined depending upon at least one of a desired final target temperature ($T_{target,\ final}$) and a desired final target pressure ($P_{target,\ final}$) of the compressed gas in the receiving vessel (108) at end of dispensing.

Aspect #13: The method of any one of the preceding Aspects, wherein the temperature target profile ($T_{target}$) is provided as a function $T_{target}=T_{target}(p_{110}, T_{max}, P_0, T_0, T_{target,final}, P_{target,final})$, wherein $p_{110}$ is an apparent pressure representative for the instantaneous pressure of the gas in the receiving vessel, $T_{max}$ is a maximum temperature representative for a maximum allowable temperature of the receiving vessel, $P_0$ is an initial apparent pressure representative for an initial pressure of the compressed gas in the receiving vessel before passing compressed gas into the receiving vessel, $T_0$ is an initial apparent temperature representative for an initial temperature of the receiving vessel before passing compressed gas into the receiving vessel, $T_{target,final}$ is a desired final target temperature when dispensing is concluded, and $P_{target,final}$ is a desired final target pressure when dispensing is concluded.

Aspect #14: The method of any one of the preceding aspects, wherein the target temperature profile ($T_{target}$) is provided as a function of an apparent pressure ($p_{110}$) of the compressed gas in the receiving vessel (108) as follows:

$$T_{target}=T_{target}(p_{110})=T_{max}-X*p_{110}^Y,$$

wherein $p_{110}$ is the apparent pressure representative for the instantaneous pressure of the gas in the receiving vessel (108), $T_{max}$ is a maximum temperature representative for a maximum allowable temperature of the receiving vessel, and X, Y are coefficients calculated from the maximum temperature ($T_{max}$), an initial apparent pressure ($P_0$) in the receiving vessel representative for an initial pressure of the compressed gas in the receiving vessel before passing compressed gas into the receiving vessel, an initial apparent temperature ($T_0$) representative for an initial temperature of the receiving vessel (108) before passing compressed gas into the receiving vessel, a desired final target temperature ($T_{target,final}$) when dispensing is concluded, and a desired final pressure ($P_{target,final}$) when dispensing is concluded.

Aspect #15: The method of any one of the preceding Aspects, further comprising the steps of monitoring an apparent temperature ($T_{112}$) which is representative for the instantaneous temperature of the receiving vessel (108), and creating an alarm and/or terminating the dispensing operation if the apparent temperature ($T_{112}$) fails to rise or does not change as expected as dispensing proceeds.

Aspect #16: The method of any one of the preceding Aspects, further comprising the steps of monitoring (i) an apparent temperature ($T_{112}$) which is representative for the instantaneous temperature of the receiving vessel (108), and (ii) an apparent pressure ($p_{110}$) representative for the instantaneous pressure of the gas in the receiving vessel (108), and creating an alarm and/or terminating the dispensing operation if the apparent temperature ($T_{112}$) fails to rise or does not change as expected as the actual pressure ($p_{110}$) rises.

Aspects 15 and 16 are disclosed here specifically in connection with the invention of providing a receiving vessel temperature profile and regulating the flow of the compressed gas to conform to that profile. Monitoring of the apparent temperature provides the advantage that a false temperature signal can be detected. A false temperature signal can be caused, for example, by a defective temperature sensing equipment of a receiving vessel or at the side of a receiving vessel, in particular of a vehicle including the receiving vessel, or a defective connection. The applicant preserves the right to claim either one of aspect 15 and 16 not only in combination with the present invention but also separately therefrom. Such a separate aspect is a method of filling a receiving vessel with compressed gas employing a supply (102) of compressed gas, a fluid conveyance (103) connecting the supply (102) and the receiving vessel (108), a flow control device (104) capable of varying the flow of compressed gas through the fluid conveyance (103), and a flow controller (114) for controlling the flow control device (104), wherein the method includes the steps of passing compressed gas from the supply (102) through the fluid conveyance (103) into the receiving vessel (108), varying the flow rate of compressed gas by means of the flow control device (104) to dispense compressed gas into the receiving vessel (108), and wherein the method further comprises the steps of at least one of the aspects 15 and 16 which can but do not need to include any of the other aspects. Dispensing can in particular be accomplished in accordance with any of the preceding aspects or, instead, in accordance with a prescribed rate of pressure rise or some other control method suitable to dispense compressed gas into the vessel safely. Monitoring the apparent temperature here and in the separate subject may include the steps of determining a first apparent temperature in a first time interval and a second apparent temperature in a second time interval, the first apparent temperature and the second apparent temperature each being representative for an instantaneous temperature of the receiving vessel and the second time interval following the first time interval. Monitoring may furthermore include determining an apparent difference between the first apparent temperature and the second apparent temperature, and comparing the apparent difference with a vessel temperature profile for the receiving vessel derived from a model of vessel heating, the profile or model being implemented in the controller.

Aspect #17: The method of any one of the preceding Aspects, further including the steps of (i) determining a target difference ($\Delta T_{target}$) between a first target temperature ($T_{target,1}$) provided in a first time interval and a second target temperature ($T_{target,2}$) provided in a second time interval of the filling process, the second time interval following the first time interval, (ii) determining a first apparent temperature ($T_{112,1}$) in the first time interval and a second apparent temperature ($T_{112,2}$) in the second time interval, the first apparent temperature and the second apparent temperature each being representative for an instantaneous temperature of the receiving vessel, (iii) determining an apparent difference ($\Delta T_{112}$) between the first apparent temperature and the second apparent temperature, (iv) comparing the apparent difference ($\Delta T_{112}$) with the target difference ($\Delta T_{target}$), and (v) creating the alarm and/or terminating the filling operation if the apparent difference ($\Delta T_{112}$) is smaller than the target difference ($\Delta T_{target}$) and the ratio of target difference to apparent difference ($\Delta T_{target}/\Delta T_{112}$) is greater than a threshold ratio, the threshold ratio preferably being at least 2 (two).

Aspect #18: A system for filling a receiving vessel with compressed gas, the system comprising:
(a) a supply (102) of compressed gas,
(b) a receiving vessel (108),
(c) a fluid conveyance (103) for operatively connecting the supply (102) and the receiving vessel (108),
(d) a flow control device (104) capable of varying the flow rate of compressed gas through the fluid conveyance (103),
(e) a flow controller (114) for controlling the flow control device (104),
(f) wherein the flow controller (114) is adapted to provide a target temperature profile of target temperatures ($T_{target}$) each representative for a target temperature of the receiving vessel (108) during dispensing,
(g) and wherein the flow controller (114) is configured to command the flow control device (104) to vary the flow rate of compressed gas such that a temperature profile that the receiving vessel (108) undergoes during dispensing conforms to the target temperature profile.

Aspect #19: The system of Aspect 18, wherein:
the system further comprises a temperature sensor (112) for sensing apparent temperatures ($T_{112}$) each representative for the instantaneous temperature of the receiving vessel (108) and generating temperature signals based on the apparent temperatures ($T_{112}$), and
the flow controller (114) is adapted to determine, successively during dispensing, a deviation between the respective apparent temperature ($T_{112}$) and the associated target temperature ($T_{target}$),
and wherein the flow controller (114) is configured to command the flow control device (104) to vary the flow rate of compressed gas in response to the deviations to conform a temperature profile of the receiving vessel (108) based on the apparent temperatures to the target temperature profile.

Aspect #20: The system of Aspect 19, wherein the flow controller (114) comprises a data memory for storing temperature data including the target temperatures ($T_{target}$) and the apparent temperatures ($T_{112}$), and a comparator for determining the deviations.

Aspect #21: The system of any one of the preceding Aspects, further comprising a pressure sensor (110) for sensing apparent pressures ($p_{110}$) representative for the instantaneous pressures of the gas in the receiving vessel (108) and generating pressure signals based on the apparent pressures ($p_{110}$), wherein the flow controller (114) comprises a generator for providing the target temperatures ($T_{target}$) by generating the target temperatures, successively during dispensing, as a function ($T_{target}(p_{110})$) of the pressure signals.

Aspect #22: The system of Aspect 21, wherein the flow controller (114) comprises a comparator for determining the deviations between the apparent temperatures ($T_{112}$) and the target temperatures ($T_{target}$).

Aspect #23: The system of Aspect 21 or 22, wherein the flow controller (114) comprises a data memory for storing temperature data and pressure data including the target temperature ($T_{target}$), optionally the apparent temperature ($T_{112}$), and the apparent pressure ($p_{110}$), wherein the generator is configured to generate the target temperature ($T_{target}$) in accordance with a programmed or hard-wired formula which contains the apparent pressure ($p_{110}$) as a variable and one or more coefficients (X, Y) each being constant during the dispensing process.

Aspect #24: The system of Aspect 23, wherein the coefficients (X, Y) are derived from at least one of an initial pressure ($P_0$) and an initial temperature ($T_0$) representative for the pressure or temperature of the compressed gas in the receiving vessel (108) at or close to the start of the dispensing process.

Aspect #25: The system of Aspect 23 or 24, wherein the coefficients (X, Y) are derived from at least one of a desired pressure ($P_{target,final}$) and a desired final target temperature ($T_{target,final}$) representative for the pressure or temperature of the gas in the receiving vessel (108) at the end of the dispensing process, the desired pressure ($P_{target,final}$) and/or final target temperature ($T_{target,final}$) being predetermined as one or more of a preset, selectable, and receivable value.

Aspect #26: The system of any one of Aspects 18 to 25, wherein the controller (114) is configured, by hard-wiring and/or programming, to perform the method of at least one of the Aspects 1 to 17.

BRIEF DESCRIPTION OF SEVERAL VIEWS OF THE DRAWINGS

The invention is explained below by way of example with reference to figures. Features disclosed there, each individually and in any combination of features, advantageously develop the subjects of the claims and also the embodiments and aspects described above.

DETAILED DESCRIPTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

In the claims, letters may be used to identify claimed steps (e.g. (a), (b), and (c)). These letters are used to aid in referring to the method steps and are not intended to indicate the order in which claimed steps are performed, unless and only to the extent that such order is specifically recited in the claims.

Figure 1:
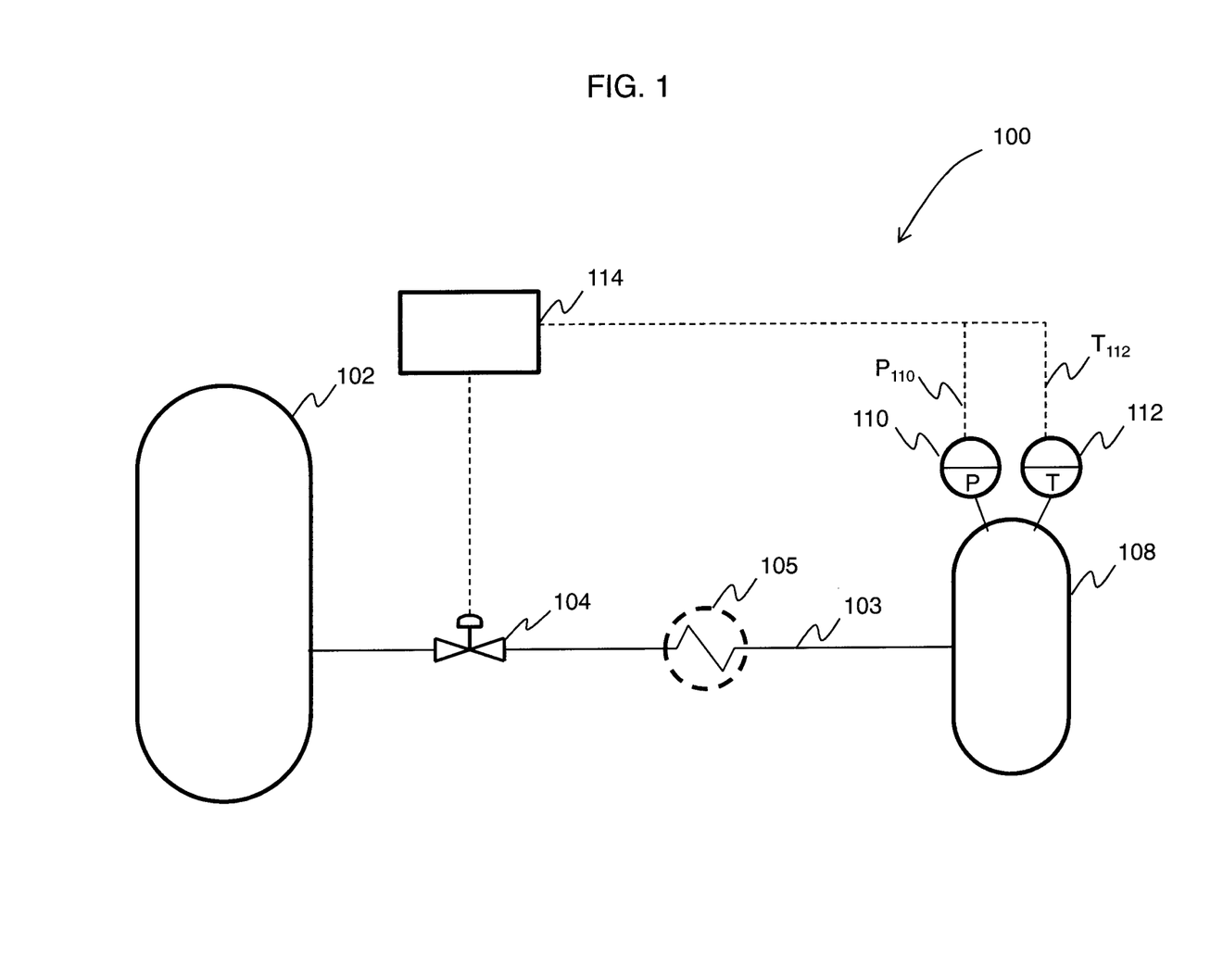
FIG. 1 shows a gas dispensing system in accordance with the invention.

FIG. 1 illustrates an example embodiment of a vessel filling system 100 according to the invention. The system 100 comprises a compressed gas supply 102 in the form of a supply vessel, a receiving vessel 108, and a fluid conveyance 103 operatively connecting the receiving vessel 108 to the supply 102. A heat exchanger 105 may be operatively disposed in the fluid conveyance 103 between the supply vessel 102 and the receiving vessel 108. The receiving vessel 108 is equipped with pressure and temperature sensing equipment comprising a pressure sensor 110 and a temperature sensor 112 with associated transducers. The system 100 furthermore comprises a flow control device 104 disposed in the fluid conveyance 103, and a flow controller 114 which communicates with the pressure sensor 110 and the temperature sensor 112 to receive pressure signals from the pressure sensor 110 and temperature signals from the temperature sensor 112. The fluid conveyance 103 is comprised of a single conduit. It may however comprise one or more further conduits in parallel with each other, for example, similar to the fluid conveyance disclosed in US 2007/0079892 A1. The flow control device 104 is exemplified as a flow control valve, preferably a solenoid valve. The flow control device 104 can be any type of flow control device capable of varying a flow cross-sectional area of the fluid conveyance 103 incrementally or, preferably, continuously.

The controller 114 communicates with the flow control device 104 to command the control device 104 in response to signals received from the pressure and temperature sensors 110 and 112. The control device 104 and flow controller 114 are configured to control the flow rate of the compressed gas from the supply 102 to the receiving vessel 108. The controller 114 can, in particular, be adapted to control the control device 104 and hence the gas flow rate such that the receiving vessel 108 is filled at a temperature adapted rate of pressure rise, a temperature adapted pressure ramp rate, i.e. an increase of gas pressure in the receiving vessel 108 per time unit measured in e.g. MPa/minute. The controller 114 can in particular be a PLC, capable of selecting the pressure ramp rate.

The pressure ramp rate is selected to control the temperature of the receiving vessel 108, determined by means of the temperature sensor 112, to conform to a prescribed target temperature profile i.e. a temperature rise path. The control method can be any standard control method such as feed forward, feedback and/or PID control. In the example embodiment, in which an apparent temperature $T_{112}$ can be measured by means of the temperature sensor 112, the flow rate of the compressed gas can be regulated by the controller 114 and control device 104 in a feedback control method, as desired. The temperature sensor 112 measures the temperature of the gas within the receiving vessel 108. The gas temperature can be taken directly as the apparent temperature $T_{112}$ since it represents the temperature of critical vessel structures of the receiving vessel 108 in good approximation. The measured gas temperature can however instead be adjusted, e.g. according to a model of heat transfer between the gas and the surrounding vessel structure. Instead of measuring the gas temperature the temperature sensor 112 may in modified variants directly measure the temperature of a heat critical structure of the receiving vessel 108, and may in such variants for example be located at or in a shell structure of the vessel or measure heat radiated by the shell of the receiving vessel 108.

The temperature rise path, i.e. the target temperature profile, can be linear or any other rise path equation, based on models of vessel heating. A target temperature profile provided as a temperature rise equation can be a function of the time elapsed since gas feed and filling have started and/or an apparent pressure $P_{110}$ representative for the instantaneous pressure in the receiving vessel 108. The apparent pressure $P_{110}$ is determined by means of the pressure sensor 110. The pressure sensor 110 may in particular be located such that it directly measures the pressure of the gas within the receiving vessel 108.

The target temperature profile may in particular obey the equation:

$$T_{target}=T_{target}(p_{110})=T_{max}-X*p_{110}^{Y}$$

wherein
$T_{target}$ is a target temperature of the target temperature profile [° C.], here $T_{target}$ (p)
$T_{max}$ is a rated maximum vessel temperature [° C.], e.g. 85° C.
$p_{110}$ is the apparent pressure determined e.g. by measurement in the receiving vessel 108
$X=e^{(LN(J)/(H-1))}$ (unitless)
$Y=(LN(C)/X)/LN(P_{target, final})$ (unitless)
$H=LN(P_0)/LN(P_{target,final})$ (unitless)
$J=C^H/A$ (unitless)
$A=T_{max}$—initial temperature $T_0$ of the receiving vessel [° C.]
$P_0$=initial pressure in the receiving vessel [MPa]
$C=T_{max}$—desired final target temperature $T_{target,final}$ [° C.]
$P_{target,final}$=desired final target pressure in the receiving vessel at end of fill [MPa]

The above equation or another appropriate equation in which the target temperature profile, i.e. the target temperatures, are generated real-time during dispensing is implemented in the controller 114, either as a hard-wired circuit or preferably as a programmed routine. When the controller 114 receives the apparent pressure $p_{110}$ and the apparent temperature $T_{112}$, it generates the target temperature $T_{target}$ in accordance with the implemented temperature rise equation and compares the instantaneous pair of temperatures, namely the target temperature $T_{target}$ and the apparent temperature $T_{112}$, to determine a deviation $\Delta T$ of the apparent temperature $T_{110}$ from the target temperature $T_{target}$. Depending on the prefix and/or the amount of the deviation, e.g. the plain difference of the apparent temperature $T_{112}$ from the target temperature $T_{target}$, the controller 114 creates an actuating variable AV to command the flow control device 104 such that the deviation $\Delta T$ is decreased. The controller 114 commands the control device 104 to decrease the flow rate of the compressed gas should the comparison reveal that the apparent temperature $T_{112}$ is too high and commands the control device 104 such that the flow rate is increased if the apparent temperature $T_{112}$ is too low.

The controller 114 may command the control device 104 such that the apparent temperature $T_{112}$ is kept below the target temperature $T_{target}$ to the extent of a certain temperature safety margin. Such a control is also regarded as "conforming" the temperature profile. If the apparent temperature is, for example, +51/−15° C. from the target temperature profile, the apparent temperature profile may be considered to conform to the target temperature profile. The apparent temperature profile may more closely conform to the target temperature profile, for example, +5/−10° C. or +1/−5° C. from the target temperature profile. The apparent temperature profile is produced from the apparent temperatures, that is it results from the apparent temperatures of the receiving vessel during dispensing. The apparent temperature profile may comprise the apparent temperatures during dispensing or a values calculated from the apparent temperatures. The apparent temperature may be stored in computer memory, but storing of the apparent temperature profile is not required.

The rated maximum vessel temperature $T_{max}$ will typically be a preset temperature valid for all types of vessels which can be filled by the system 100. The system 100, for example the flow controller 114, may however also be capable of identifying the rated maximum vessel temperature of the receiving vessel 108 to be filled, respectively, and select $T_{max}$ accordingly.

The coefficients X and Y are based exclusively on preset or preselectable values and process variables which are determined only once shortly before, at, or shortly after starting to feed the compressed gas and fill the receiving vessel 108. These values and process variables are $T_{max}$, the initial temperature $T_0$ of the receiving vessel 108, the initial pressure $P_0$ in the receiving vessel 108, the desired final target temperature and the desired pressure in the receiving vessel 108 at the end of filling. The initial temperature $T_0$ can in particular be the apparent temperature $T_{112}$ measured by means of the temperature sensor 110 shortly before, at, or shortly after starting the dispensing process. The initial pressure can be determined e.g. measured shortly before, at, or shortly after the start of feeding the compressed gas and filling the receiving vessel, and can be $p_{110}$ at that time. The desired final target temperature is a preselected upper temperature value of the temperature profile and is a temperature value below $T_{max}$. The desired pressure in the receiving vessel 108 at the end of filling is a preselected upper pressure value of the receiving vessel 108. The desired pressure at the end of fill can be a preset value of the flow controller 114 or be determined by the flow controller 114 based on identification data optionally received from the receiving vessel 108, either automatically upon connection or inputted by an operator. Once $T_{max}$ has been selected, e.g. as a preset value or as a value received from the receiving vessel 108 or from a system in which the vessel 108 is embedded as for example an automobile or truck, and the coefficients X and Y calculated, the apparent pressure $p_{110}$ is the only variable of the temperature rise equation while filling proceeds.

EXAMPLE

Figure 2:
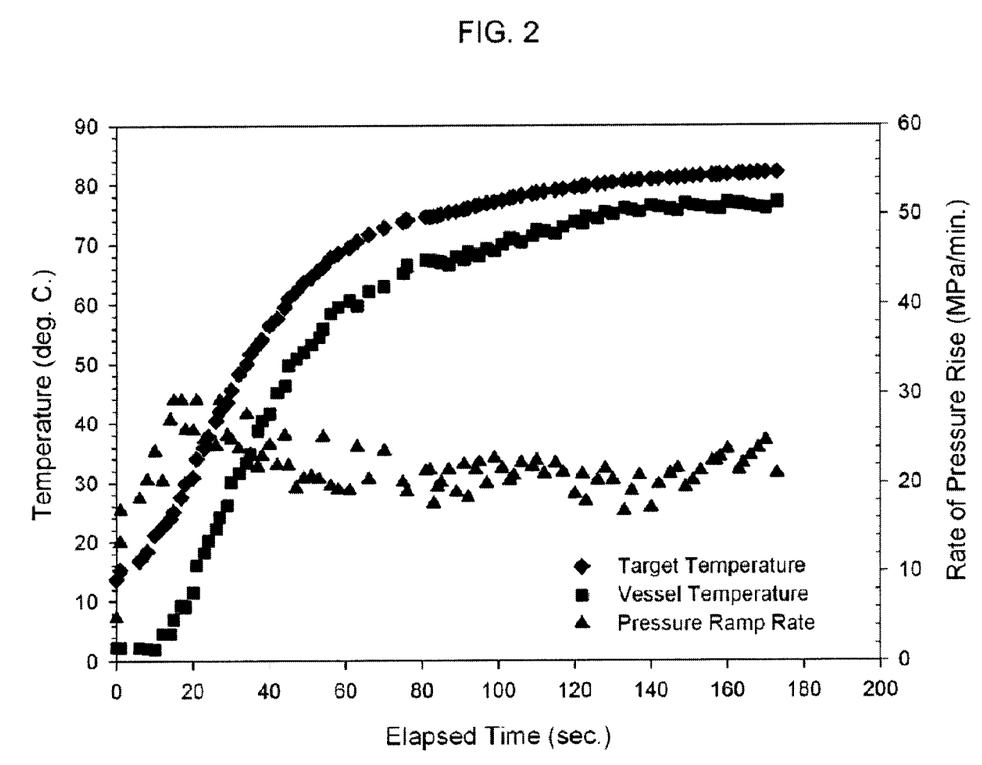
FIG. 2 shows a plot of target temperature and apparent temperature together with pressure ramp rate each versus elapsed dispensing time.

FIG. 2 is a plot derived from an example dispensing process according to the invention. It is a plot of target temperature $T_{target}$ in accordance with the above temperature rise equation, receiving vessel temperature $T_{112}$, and the pressure ramp rate, i.e. the rate of pressure change within the receiving vessel 108, measured in MPa per minute. On the x-axis the elapsed dispensing time is plotted in seconds of elapsed time. In the example filling process the receiving vessel 108 has been filled under field conditions up to a target temperature of 60° C. The sections of the graphs belonging to temperatures above 60° C. have been derived by extrapolation of the data gathered during the example dispensing process.

As can be derived from the plot, a good match is achieved by rising the ramp rate in a first phase of the filling process up to a peak and decreasing it slowly from the peak in a consecutive second phase of the filling process to a value which can be kept relatively constant during the remainder of the filling process.

Figure 3:
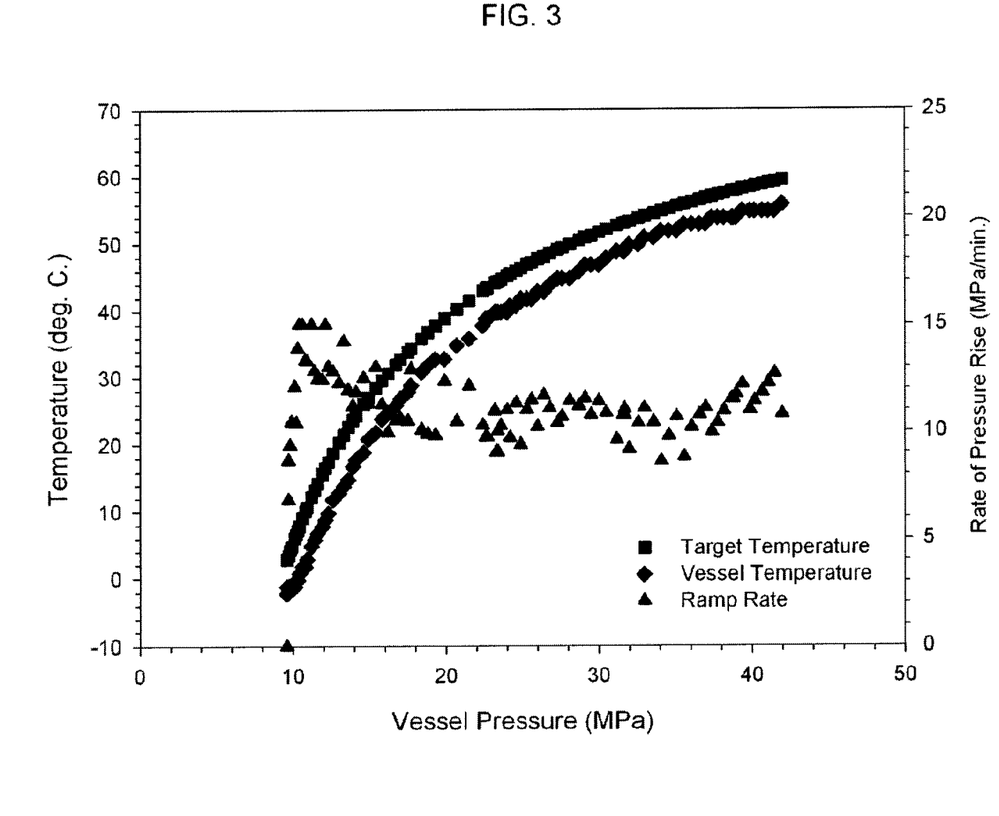
FIG. 3 shows a plot of target temperature, apparent temperature, and pressure ramp rate, each versus apparent pressure.

In FIG. 3 the target temperature $T_{target}$, the apparent temperature $T_{112}$ and the ramp rate are plotted versus the pressure within the receiving vessel 108, for which in particular the apparent pressure $p_{110}$ can be taken. The graphs of FIG. 3—vessel temperature, target temperature and ramp rate—represent exclusively data from the example dispensing process performed under field conditions.

I claim:

1. A method for dispensing a compressed gas into a receiving vessel employing a supply of compressed gas, a fluid conveyance operatively connecting the supply to the receiving vessel, a flow control device capable of varying the flow rate of compressed gas through the fluid conveyance, and a flow controller for controlling the flow control device, the method comprising the steps of:
    (a) passing compressed gas from the supply through the fluid conveyance into the receiving vessel;
    (b) providing a target temperature from a target temperature profile for the receiving vessel, the target temperature profile for the receiving vessel providing target temperatures during dispensing;
    (c) determining an apparent temperature which is representative for an instantaneous temperature of the receiving vessel;
    (d) determining a deviation between the apparent temperature and the target temperature from the target temperature profile; and
    (e) varying the flow rate of compressed gas during dispensing by means of the flow control device to conform a temperature profile that the receiving vessel undergoes during dispensing to the target temperature profile; and
    (f) repeating steps (b), (c), (d), and (e) during the dispensing process,
    (g) wherein the flow rate of compressed gas is varied in step (e) in response to the deviation to conform an apparent temperature profile of the receiving vessel to the target temperature profile, wherein the apparent temperature profile is produced from the apparent temperatures.

2. The method of claim 1, wherein the target temperature is provided as a function of a pressure which is representative for the instantaneous pressure of the compressed gas in the receiving vessel.

3. The method of claim 1, wherein step (b) includes determining an apparent pressure which is representative for the instantaneous pressure of the compressed gas in the receiving vessel and determining the target temperature by generating the target temperature as a function of the apparent pressure.

4. The method of claim 1, further comprising a step of determining an initial apparent pressure representative for an initial pressure of the compressed gas in the receiving vessel before passing compressed gas into the receiving vessel, wherein the target temperature profile is determined depending on the initial apparent pressure.

5. The method of claim 1, further comprising a step of determining an initial apparent temperature representative for an initial temperature of the receiving vessel before passing compressed gas into the receiving vessel, wherein the target temperature profile is determined depending on the initial apparent temperature.

6. The method of claim 1, further comprising the step of providing a maximum temperature representative for a maximum allowable temperature of the receiving vessel, wherein the target temperature profile is determined depending on the maximum temperature.

7. The method of claim 1, wherein the compressed gas is dispensed into the receiving vessel at a rate of pressure rise, and the rate of pressure rise is varied to conform the temperature profile of the receiving vessel to the target temperature profile.

8. The method of claim 1, wherein the compressed gas is dispensed into the receiving vessel at a rate of pressure rise, and the rate of pressure rise is varied to decrease the deviation between the apparent temperatures and the target temperatures.

9. The method of claim 1, wherein the target temperature profile is predetermined, and linear or based on a model of receiving vessel heating.

10. The method of claim 1, wherein the target temperature profile is provided as a temperature path as a function of an apparent pressure which is representative for the instantaneous pressure of compressed gas in the receiving vessel and/or elapsed dispensing time.

11. The method of claim 1, wherein the target temperature profile is determined depending upon at least one of a desired final target temperature and a desired final target pressure of the compressed gas in the receiving vessel at end of dispensing.

12. The method of claim 1, wherein the target temperature profile is provided as a function, $T_{target} = T_{target}(P_{110}, T_{max}, P_0, T_0, T_{target,final}, P_{target,final})$, wherein
   $P_{110}$ is an apparent pressure representative for the instantaneous pressure of the gas in the receiving vessel,
   Tmax is a maximum temperature representative for a maximum allowable temperature of the receiving vessel,
   $P_o$ is an initial apparent pressure representative for an initial pressure of the compressed gas in the receiving vessel before passing compressed gas into the receiving vessel,
   $T_o$ is an initial apparent temperature representative for an initial temperature of the receiving vessel before passing compressed gas into the receiving vessel,
   $T_{target,final}$ is a desired final target temperature when dispensing is concluded, and
   $P_{target,final}$ is a desired final target pressure when dispensing is concluded.

13. The method of claim 1, wherein the target temperature profile is provided as a function of an apparent pressure of the compressed gas in the receiving vessel as follows:

$$T_{target} = T_{target}(p_{110}) = T_{max} - X * p_{110}^Y,$$

wherein
   $p_{110}$ is the apparent pressure representative for the instantaneous pressure of the gas in the receiving vessel,
   $T_{max}$ is a maximum temperature representative for a maximum allowable temperature of the receiving vessel, and
   X, Y are coefficients calculated from the maximum temperature, an initial apparent pressure in the receiving vessel representative for an initial pressure of the compressed gas in the receiving vessel before passing compressed gas into the receiving vessel, an initial apparent temperature representative for an initial temperature of the receiving vessel before passing compressed gas into the receiving vessel, a desired final target temperature when dispensing is concluded, and a desired final pressure when dispensing is concluded.

14. The method of claim 1, further comprising the steps of monitoring an apparent temperature which is representative for the instantaneous temperature of the receiving vessel, and creating an alarm and/or terminating the filling operation if the apparent temperature fails to rise or does not change as expected as dispensing proceeds.

15. The method of claim 1, further comprising the steps of monitoring (i) an apparent temperature which is representative for the instantaneous temperature of the receiving vessel, and (ii) an apparent pressure representative for the instantaneous pressure of the gas in the receiving vessel, and creating an alarm and/or terminating the filling operation if the apparent temperature fails to rise or does not change as expected as the actual pressure rises.

16. The method of claim 1, further comprising the steps of
   (i) determining a target difference between a first target temperature provided in a first time interval and a second target temperature provided in a second time interval of the dispensing process, the second time interval following the first time interval,
   (ii) determining a first apparent temperature in the first time interval and a second apparent temperature in the second time interval, the first apparent temperature and the second apparent temperature each being representative for an instantaneous temperature of the receiving vessel,
   (iii) determining an apparent difference between the first apparent temperature and the second apparent temperature,
   (iv) comparing the apparent difference with the target difference, and
   (v) creating an alarm and/or terminating the dispensing operation if the apparent difference is smaller than the target difference and the ratio of target difference to apparent difference is greater than a threshold ratio, the threshold ratio preferably being at least 2 (two).

17. A system for dispensing compressed gas into a receiving vessel, the system comprising:
   (a) a supply of compressed gas;
   (b) a receiving vessel;
   (c) a fluid conveyance for operatively connecting the supply to the receiving vessel;
   (d) a flow control device capable of varying the flow rate of compressed gas through the fluid conveyance;
   (e) a flow controller for controlling the flow control device; and
   (f) a pressure sensor for sensing apparent pressures representative for the instantaneous pressures of the compressed gas in the receiving vessel, and generating pressure signals based on the apparent pressures,
   (g) wherein the flow controller is configured to store a target temperature profile for the receiving vessel, the target temperature profile for the receiving vessel providing target temperatures during dispensing;
   (h) wherein the flow controller comprises a generator for determining the target temperatures by generating the target temperatures, successively during dispensing, as a function of the pressure signals; and
   (i) wherein the flow controller is configured to command the flow control device to vary the flow rate of compressed gas such that the temperature of the receiving vessel conforms to the target temperature profile.

18. The system of claim 17, wherein the flow controller comprises a comparator for determining the deviations between the apparent temperatures and the target temperatures.

19. The system of claim 17, wherein the flow controller comprises a data memory for storing temperature data and pressure data including the target temperature and the apparent pressure, wherein the generator is configured to generate the target temperature in accordance with a programmed or hard-wired formula which contains the apparent pressure as a variable and one or more coefficients each being constant during the dispensing process.

20. The system of claim 19, wherein the coefficients are derived from at least one of an initial apparent pressure and an initial apparent temperature, the initial apparent pressure representative for an initial pressure of the compressed gas in the receiving vessel at or close to the start of the dispensing process, and the initial apparent temperature representative for an initial temperature of the receiving vessel at or close to the start of the dispensing process.

21. The system of claim 19, wherein the coefficients are derived from at least one of a desired final target pressure and a desired final target temperature, the desired final target pressure representative for the pressure of the compressed gas when dispensing is concluded, and the desired final target temperature representative for the temperature of the compressed gas when dispensing is concluded, the desired final target pressure and/or desired final target temperature being predetermined as one or more of a preset, selectable, and receivable value.

22. The system of claim 17, wherein:
the system further comprises a temperature sensor for sensing apparent temperatures representative for the instantaneous temperatures of the receiving vessel and generating temperature signals based on the apparent temperatures; and
the flow controller is configured to determine, successively during dispensing, deviations between the respective apparent temperatures and the associated target temperatures;
wherein the flow controller is configured to command the flow control device to vary the flow rate of compressed gas in response to the deviations to conform a temperature profile of the receiving vessel based on the apparent temperatures to the target temperature profile.

23. The system of claim 22, wherein the flow controller comprises a data memory for storing temperature data including the target temperatures and the apparent temperatures, and a comparator for determining the deviations.

\* \* \* \* \*